(12) United States Patent
Kage

(10) Patent No.: US 6,335,977 B1
(45) Date of Patent: Jan. 1, 2002

(54) ACTION RECOGNIZING APPARATUS AND RECORDING MEDIUM IN THAT ACTION RECOGNIZING PROGRAM IS RECORDED

(75) Inventor: Hiroshi Kage, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/084,950

(22) Filed: May 28, 1998

(30) Foreign Application Priority Data

May 28, 1997 (JP) .............................................. 9-138591

(51) Int. Cl.$^7$ ................................................. G06K 9/00

(52) U.S. Cl. ....................................... 382/107; 382/154

(58) Field of Search ................................ 382/153, 154, 382/103, 107; 345/474, 473

(56) References Cited

U.S. PATENT DOCUMENTS

| | | | | |
|---|---|---|---|---|
| 4,739,400 A | * | 4/1988 | Veitch | 358/108 |
| 5,214,758 A | * | 5/1993 | Ohba et al. | 395/164 |
| 5,227,985 A | * | 7/1993 | DeMenthon | 364/559 |
| 5,495,576 A | * | 2/1996 | Ritchey | 395/125 |
| 5,552,823 A | * | 9/1996 | Kageyama | 348/155 |
| 5,633,993 A | * | 5/1997 | Redmann et al. | 395/119 |
| 5,767,861 A | * | 6/1998 | Kimura | 345/473 |
| 5,877,778 A | * | 3/1999 | Dow et al. | 345/474 |
| 6,154,723 A | * | 11/2000 | Cox et al. | 704/270 |

FOREIGN PATENT DOCUMENTS

| | | | | |
|---|---|---|---|---|
| WO | WO-9322762 A1 | * | 11/1993 | 382/107 |

OTHER PUBLICATIONS

K. Rohr, "Towards Model–Based Recognition of Human Movements In Image Sequences", CVGIP: Image Understanding, vol. 59, No. 1, Jan. 1994, pp. 94–115.

Gavrilla et al., "3–D Model–Based Tracking of Humans in Action: a Multi–View Approach", in Proc. IEEE Computer Vision and Pattern Recognition, San Francisco, 1996.

Torres et al., "A system for human motion matching between synthetic and real images based on a biomechanic graphical model", ISBN: 0–8186–6435–5, Nov. 1994.*

Sudhaker et al., "Motion estimation from a sequence of stereo images: a direct method", ISSN: 0018–9472, Jul. 1994.*

(List continued on next page.)

*Primary Examiner*—Amelia M. Au
*Assistant Examiner*—Martin Miller
(74) *Attorney, Agent, or Firm*—Leydig, Voit, & Mayer, Ltd.

(57) ABSTRACT

Motion of a human under various conditions is reproduced by a computer graphics and the like in a real time manner without using auxiliary means such as a light reflection marker. An action recognizing apparatus is arranged by an image input unit 1 for imaging an image containing motion of an imaging object at a plurality of imaging angles by a plurality of image sensors to thereby acquire a plurality of two-dimensional images; a two-dimensional motion detecting unit 2 for calculating a direction of motion and strength thereof of each of pixels within each of the two-dimensional images imaged, a region specifying unit 3 for specifying such a region having strength of the calculated motion larger than, or equal to a predetermined strength value; a three-dimensional motion detecting unit 4 for positioning the specific region specified with respect to the plurality of two-dimensional images, whereby a three-dimensional position of the specific region and three-dimensional motion of the specific region are calculated; a portion predicting unit 5 for predicting that the calculated three-dimensional motion corresponds to any of the portions of the imaging object; and an action reproducing unit 6 for moving a model in a simulation manner based the motion predicted by the portion predicting unit 5 with respect to each of the portions, whereby motion of the imaging object is reproduced on the model.

4 Claims, 11 Drawing Sheets

OTHER PUBLICATIONS

Pentland et al., "Space—time gestures", ISBN 0-8186-3880-X, Jun. 1993.*

Perales et al, "An automatic two-camera human motion perception system based on biomechanic model matching", ISBN: 0-7803-0233-8, Oct. 1991.*

Young et al., "3-D motion estimation using a sequence of noisy stereo images: models, estimation, and uniqueness results", ISSN: 0162-8828, Aug. 1990.

Maciejewski, A.A., "Dealing with the ill-conditioned equations of motion for articulated figures", ISSN: 0272-1716, Nov. 1994.

Ishii, H. et al., "An image synthesizing method based on human motion recognition from stereo images", International Workshop on Robot and Human Communication, 1992.*

* cited by examiner

ACTION RECOGNIZING APPARATUS AND RECORDING MEDIUM IN THAT ACTION RECOGNIZING PROGRAM IS RECORDED

BACKGROUND OF THE INVENTION

The present invention is related to an action recognizing apparatus for imaging motion of a human and the like, for specifying motion of this imaged object from an acquired image with respect to each of the portions thereof, and for reproducing the motion of the imaged object based on the specified motion, and also related to a recording medium in which a motion recognizing program is recorded.

As the conventional technique in which a gesture of a human is imaged by an image sensor such as a CCD, the imaged gesture is reflected by motion of a person expressed by computer graphics, and then the original gesture is reproduced on a computer screen. One optical motion capture is described in the publication titled "Imidas '97" at pages 846 to 847. In this optical motion capture, light reflection markers are attached to respective portions of the human body as the imaged object. The motion of these portions is imaged by a camera along different directions, the three-dimensional positions of the light reflection markers at respective time instants are detected by processing the acquired images, and then three-dimensional data about the motion of the hands and the feet are calculated based on the three-dimensional positions. The original motion of the human can be reproduced on a human model expressed by the computer graphics employing these three-dimensional data.

The above-described conventional action recognizing system has the following problems. That is, it is very difficult to attach the light reflection markers specifying the respective portions of the human body onto the respective portions of the human body. Motion of an animal, such as a monkey, other than a human cannot be easily reproduced in accordance with this conventional action recognizing system because it is very difficult to attach the light reflection markers to the animal. There is another problem in that the application range of this conventional action recognizing system is limited.

Also, in accordance with this conventional action recognizing system, since the positions of the light reflection markers at respective time instants are detected to analyze their motion, there are situations in which all motions cannot be acquired, for instance, some of the light reflection markers may be hidden. As a result, after the detection data is manually corrected off-line, producing the motion, the corrected detection data is used to reflect the original motion of the human model. As a consequence, there is a further problem that the motion of the human could not be reflected on the human model in real time.

SUMMARY OF THE INVENTION

The present invention has been made to solve the above-described problem, and, therefore, has an object of providing action recognizing apparatus reproducing motion of an imaged object, such as a human, in real time by analyzing motion of an image produced by imaging the motion of the imaged object without employing an auxiliary means, such as a light reflection marker. Also, another object of the present invention is to provide a recording medium in which an action recognizing program is recorded.

An action recognizing apparatus, according to a first arrangement of the present invention, comprises an image input unit for forming an image containing motion of an imaged object at a plurality of imaging angles with a plurality of image sensors to acquire a plurality of two-dimensional images; a two-dimensional motion detecting unit for calculating a direction and magnitude of motion of each of pixels within each of the two-dimensional images formed by the image input unit; a region specifying unit for specifying a region having a magnitude of motion larger than or equal to a predetermined magnitude, the motion magnitude being calculated by the two-dimensional motion detecting unit; a three-dimensional motion detecting unit for positioning the specific region specified by the region specifying unit with respect to the plurality of two-dimensional images, whereby a three-dimensional position of the specific region and three-dimensional motion of the specific region are calculated; a portion predicting unit for predicting that the three-dimensional motion of the specific region calculated by the three-dimensional motion detecting unit corresponds to any of the portions of the imaging object; and an action reproducing unit for moving a model in a simulation manner based the motion predicted by the portion predicting unit with respect to each of the portions, whereby motion of the imaged object is reproduced on the model.

Also, the region specifying unit in the action recognizing apparatus, according to a second arrangement of the present invention, subdivides a two-dimensional image into a plurality of scanning ranges which overlap with each other; scans each of the scanning ranges to select as a subject region a region having a maximum averaged value of motion magnitude of the respective pixels; and furthermore establishes a region where the averaged value is larger than a predetermined value as the specific region.

Also, the action reproducing unit in the action recognizing apparatus, according to a third arrangement of the present invention, reproduces the motion of the imaging object by way of motion of a model expressed by computer graphics.

Also, the action reproducing unit in the action recognizing apparatus, according to a fourth arrangement of the present invention, reproduces the motion of the imaging object by way of motion of an automatic control machine.

Also, the action reproducing unit in the action recognizing apparatus, according to a fifth arrangement of the present invention, includes a second model, different from the model used to reproduce the motion of the imaged object, whereby a mutual effect between the motion of the imaging operation and the motion of the second model is realized in a simulation.

In a recording medium of the present invention, an action recognizing program causes a computer to calculate a direction and magnitude of motion of each of pixels within two-dimensional images formed at a plurality of imaging angles; specify a region having calculated motion magnitude larger than or equal to a predetermined magnitude; position the specified specific region with respect to the plurality of two-dimensional images, whereby a three-dimensional position of the specific region and three-dimensional motion of the specific region are calculated; predict the three-dimensional motion of the calculated specific region corresponding to any of the portions of the imaged object; and move a model in a simulation based on the motion with respect to each of the predicted portions, whereby motion of the imaging object is reproduced on the model.

DETAILED DESCRIPTION OF THE PREFERRED EMBODIMENTS

EMBODIMENT 1

Figure 1:
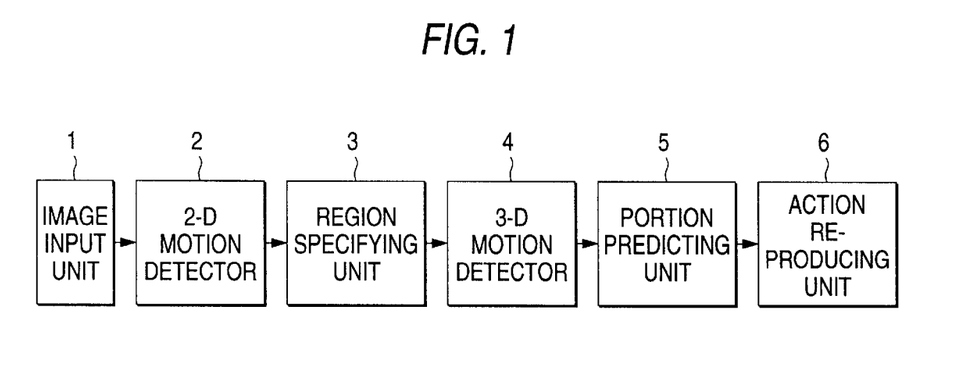
FIG. 1 is a block diagram showing an arrangement of an action recognizing apparatus according to an embodiment 1 of the present invention.

Referring now to the drawings, an embodiment 1 of the present invention will be described. FIG. 1 is a schematic block diagram of an action recognizing apparatus according to embodiment 1 of the present invention. This action recognizing apparatus includes six units, namely, an image input unit 1, a two-dimensional motion detecting unit 2, a region specifying unit 3, a three-dimensional motion detecting unit 4, a portion predicting unit 5, and an action reproducing unit 6.

The image input unit 1 includes a plurality of image sensors for forming images of motion of an object at different angles. This embodiment 1 illustrates the image input unit 1 as including two image sensors.

The two-dimensional motion detecting unit 2 calculates two-dimensional motion from an optical flow with respect to images sequentially output from the respective image sensors of the image input unit 1. In other words, the direction and magnitude of motion for every pixel of each image are calculated based upon temporal and spatial changes in brightness of the respective pixels.

The region specifying unit 3 specifies a region having significant motion from the optical flow detected by the two-dimensional motion detecting unit 2, and calculates a direction and magnitude of two-dimensional motion of the entire region. Concretely speaking, the direction and magnitude of the two-dimensional motion are calculated based upon a vector average value of the optical flows of the respective regions.

The three-dimensional motion detecting unit 4 calculates three-dimensional motion involving depth in correspondence with the region specified by the region specifying unit 3 while using the differences in the imaging angles of the respective image sensors employed in the image input unit 1.

The portion predicting unit 5 predicts whether the region detected by the three-dimensional motion detecting unit 4 corresponds to motion of respective portions of a human.

The action reproducing unit 6 moves a human model expressed by computer graphics based on the motion of the portion predicted by the portion predicting unit 5.

Figure 2:
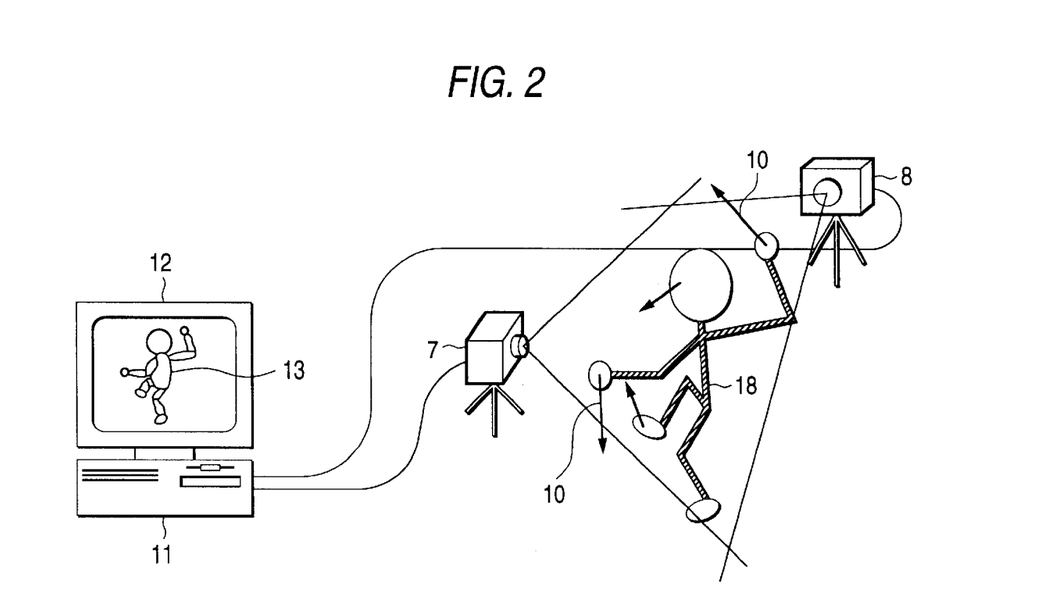
FIG. 2 is an illustration representing an example of the action recognizing apparatus according to the embodiment 1 of the present invention.

FIG. 2 is an illustration of an example for moving a human model in a simulation using the action recognizing apparatus according to this embodiment 1, and represents a positional relationship between a human 18 functioning as an imaged subject and image sensors 7 and 8. The human 18 moves respective portions of his body, such as his head, his hands, and his feet, along directions indicated by arrows 10, so that a human model 13 represented on a screen of a CRT monitor 12 connected to a computer 11 is moved in real time.

Figure 3:
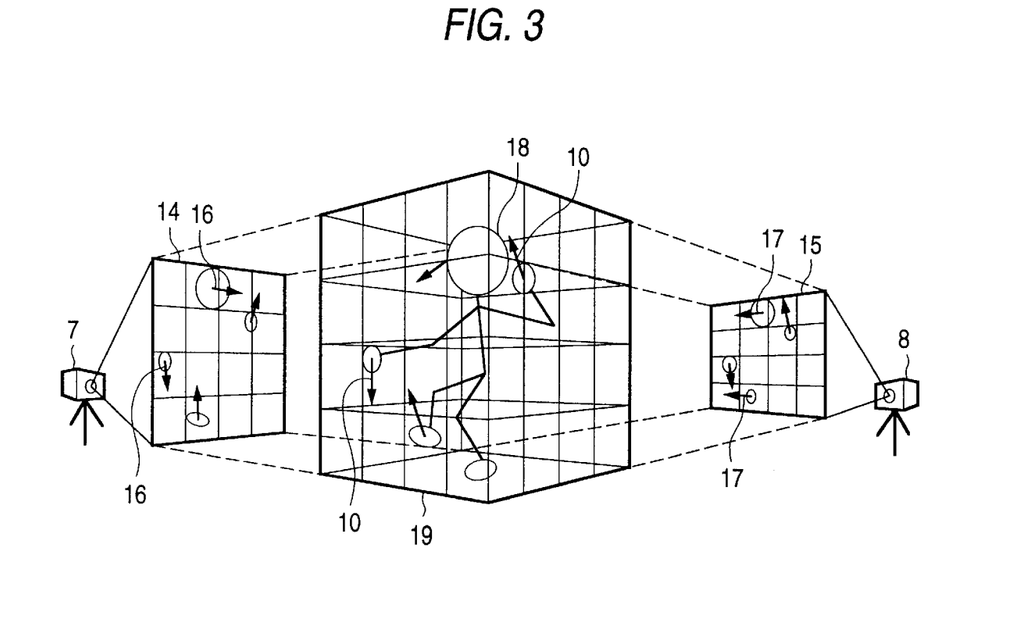
FIG. 3 is a diagram indicating a projection relationship and explaining that when a human to be imaged is located within intersecting imaging ranges of two image sensors, the image is projected onto a projection plane, according to embodiment 1 of the present invention.
Figure 4A:
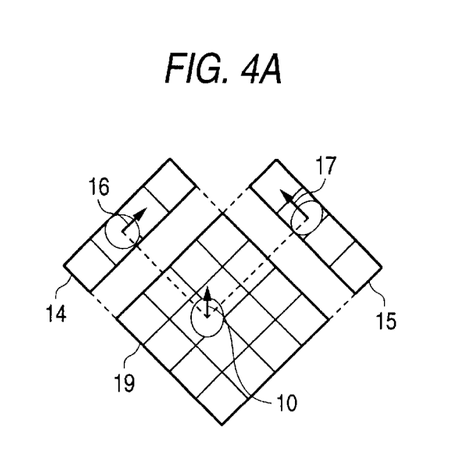
FIGS. 4A to 4D are diagrams showing motion of the respective portions of a human captured in each of four levels when the intersecting imaging ranges of the two image sensors are subdivided into the four levels based on height, according to embodiment 1 of the present invention.
Figure 4B:
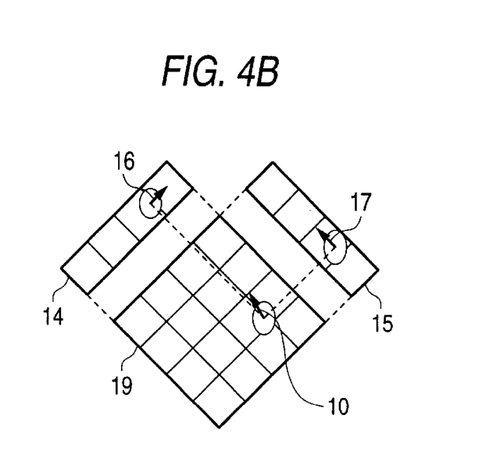
Figure 4C:
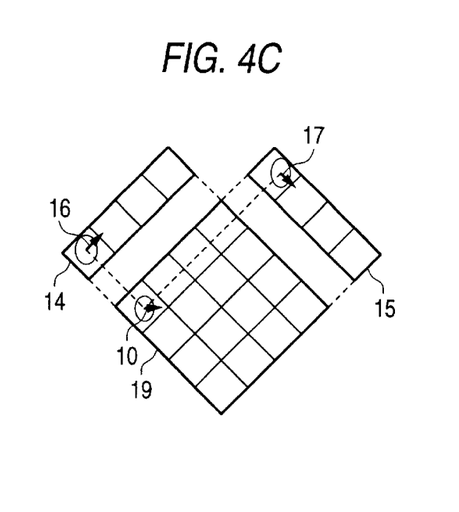
Figure 4D:
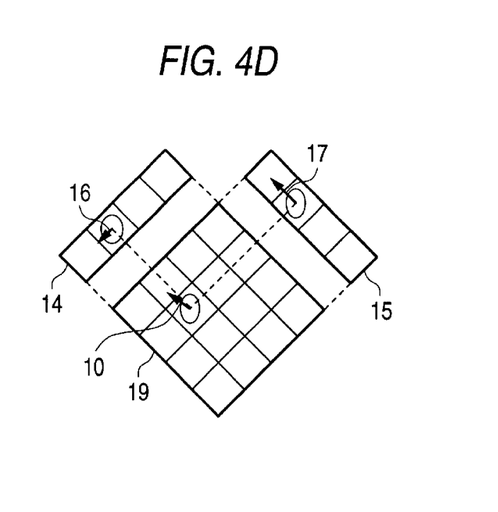

FIG. 3 illustratively shows how the motion of the human 18 within an intersecting imaging range 19 of the image sensors 7 and 8 is projected on each of imaging planes 14 and 15 of the image sensors 7 and 8. The motions 10 of the respective portions are projected as arrows 16 on the imaging plane 14, and projected as arrows 17 on the imaging plane 15.

FIGS. 4A to 4D represent the motion 10 of a moving portion and a horizontal position of this moving portion when the intersecting imaging range 19 is subdivided into four levels, depending upon height, and the moving portion is present in a horizontal plane of each level. Furthermore, FIGS. 4A–4D indicate how the motion 10 of the respective portions is projected onto the imaging planes 14 and 15 with respect to each of the levels. FIG. 4A to FIG. 4D represent motion 16 and motion 17 when the motion 10 of the head, right hand, left hand, and left foot are respectively projected on the imaging planes 14 and 15 at the respective levels. While using this motion projection relationship, it is possible to predict three-dimensional motion involving a depth direction from the two-dimensional motion in the respective imaging planes. In other words, the two-dimensional motion indicated by the optical flow and the like is calculated from the output image from the image sensors 7 and 8 with respect to each of the imaging planes. Among the two-dimensional motions calculated with respect to each of the imaging planes, a region having significant motion is identified. Furthermore, the three-dimensional motion involving the depth direction can be predicted from the two-dimensional motion in these regions and the positions of these regions.

Now, a description is given of an example in which an optical flow is obtained using a real image, and three-dimensional motion is predicted.

Figure 5A:
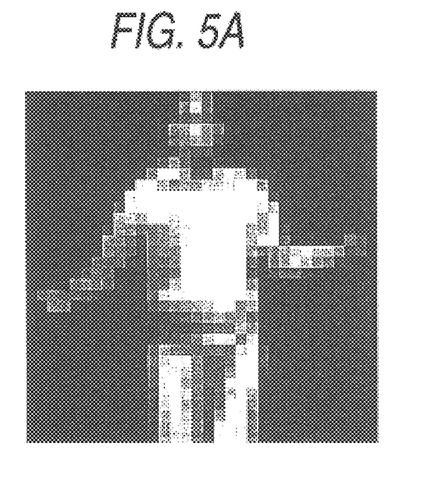
FIGS. 5A and 5B are illustrations indicating image data of the two image sensors according to embodiment 1 of the present invention.
Figure 5B:
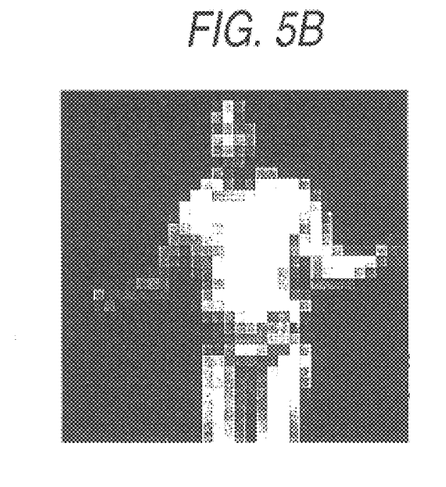
Figure 6A:
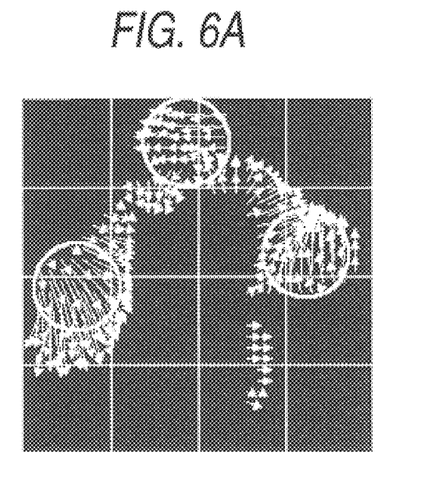
FIGS. 6A and 6B are illustrations showing an optical flow and three specific regions which are acquired from images formed by the respective image sensors, according to embodiment 1 of the present invention.
Figure 6B:
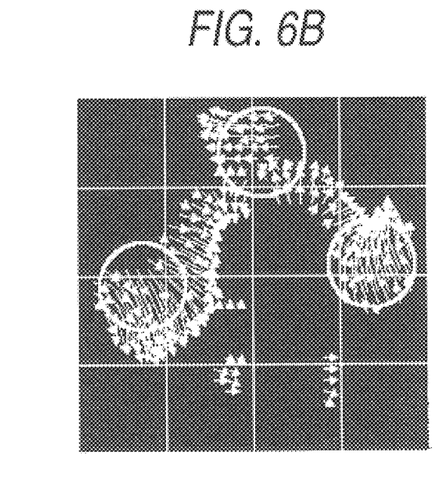

FIGS. 5A and 5B represent an example of image data outputted from two sets of image sensors installed at different imaging angles relative to an imaged object. FIGS. 6A and 6B show optical flows with respect to the respective output images. A white circle shown in FIGS. 6A and 6B represents a specific region having significant motion and identified by the region specifying unit 3. As a concrete method of calculating an optical flow, for instance, Japanese Patent Publication 4-241079 describes a method employing a neural network. In this calculating method, the velocity vectors (motion vectors) of the respective pixels are acquired from the temporal and spatial changes in the brightness of the respective pixels in the two-dimensional image, and then the direction of the motion and the magnitude thereof are calculated with respect to each of the pixels. It should be understood that as the optical flow calculating method, other calculating methods than the above-explained optical flow calculating method may be employed.

Referring now to FIGS. 7A to 7D and FIG. 8, a description is given of how to detect the specific region indicated by the white circle using the region specifying unit 3 from the acquired optical flow. At the same time, a description is given of a corresponding relationship between these drawings and process operations defined at steps S1 to S3 of a flow chart for explaining a detection algorithm shown in FIG. 9.

Figure 7A:
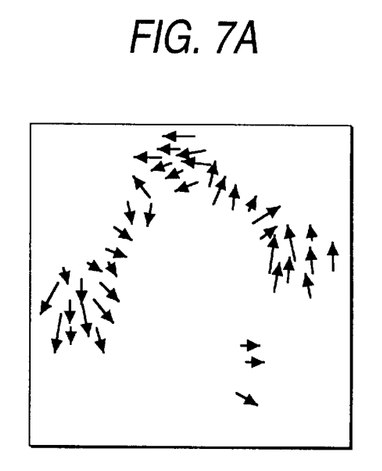
FIGS. 7A to 7D are explanatory diagrams explaining operation of a region specifying unit according to embodiment 1 of the present invention.
Figure 7B:
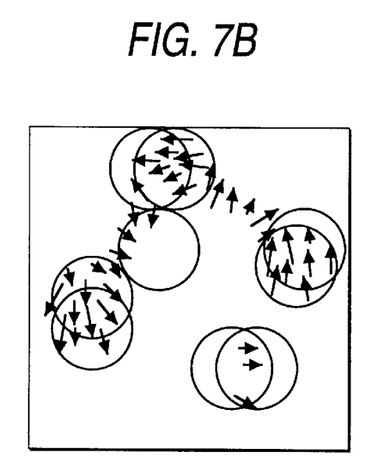
Figure 7C:
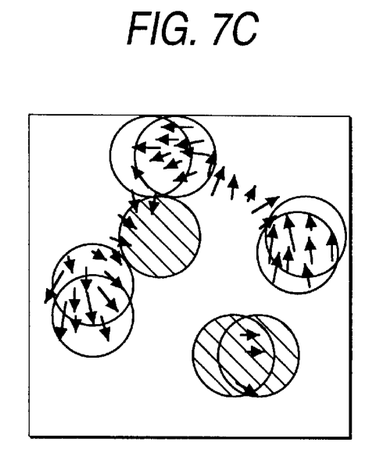
Figure 7D:
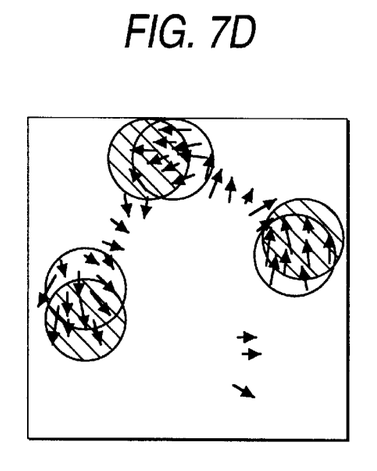
Figure 8:
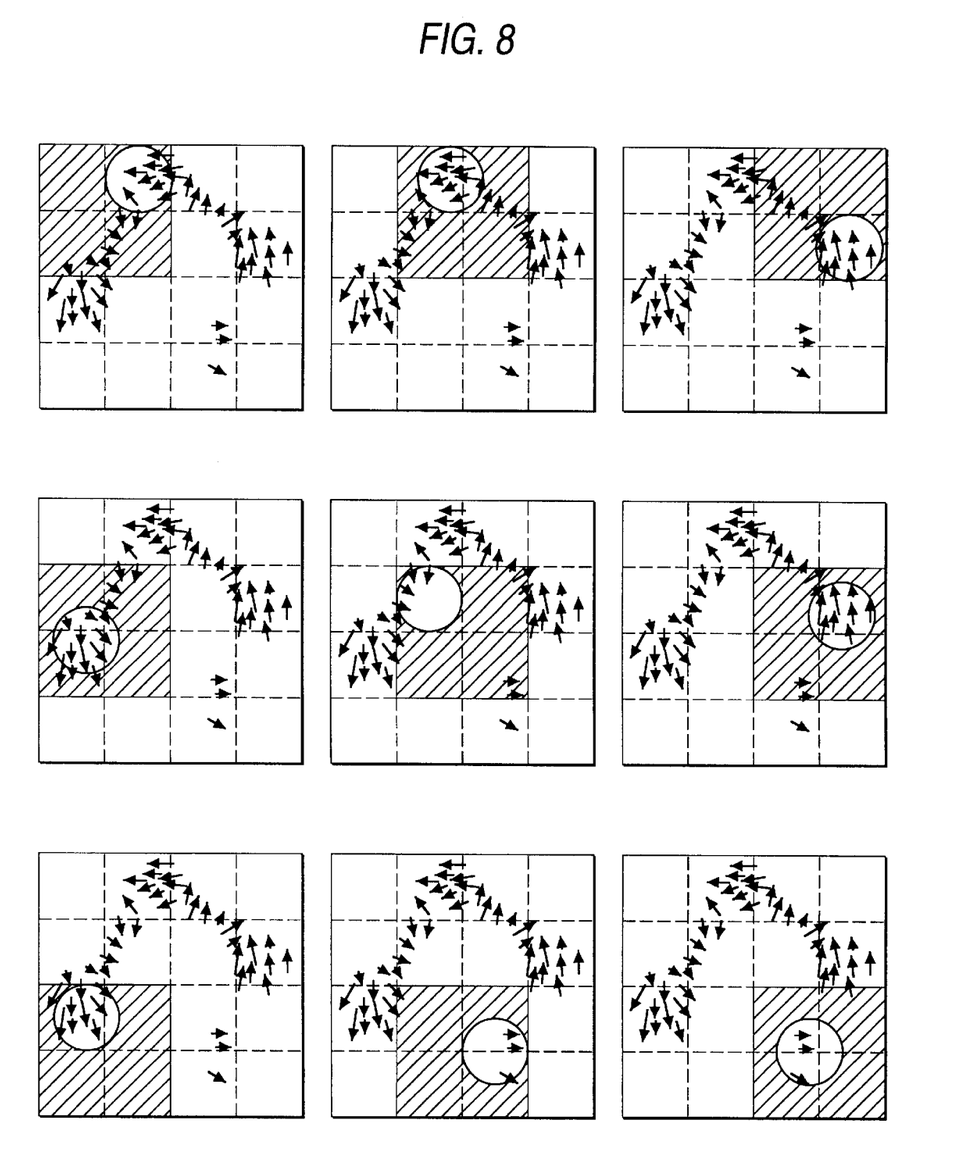
FIG. 8 is a diagram indicating nine scanning regions of the region specifying unit according to embodiment 1 of the present invention.
Figure 9:
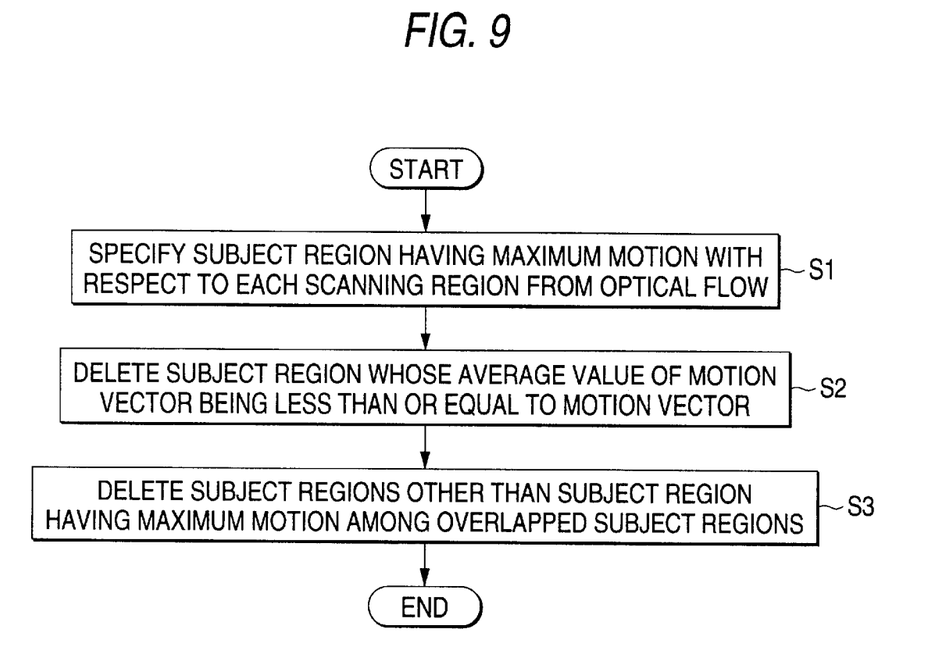
FIG. 9 is a flow chart explaining a specific region determining algorithm by the region specifying unit according to embodiment 1.

FIG. 7A represents an example of an optical flow calculated in the two-dimensional motion detecting unit 2. Based upon this optical flow calculated by the two-dimensional motion detecting unit 2, nine subject regions, as shown in FIG. 7B, are detected by the region specifying unit 3 (step S1). Each of these nine subject regions is selected from sixteen scanning ranges which mutually overlap, as indicated in FIG. 8. That is, a circular region having a constant radius is scanned within a scanning range for a maximum of an averaged value of motion vectors (referred to as an "averaged vector" hereinafter). Next, while using as a reference the dimensions of the averaged vectors corresponding to the respective subject regions, a subject region having a value smaller than or equal to a preset threshold value is deleted (step S2, namely, the hatched subject regions of FIG. 7C are deleted). Among the remaining subject regions, a subject region is deleted if it overlaps another subject region and has a smaller averaged vector (step S3, namely, the hatched subject regions of FIG. 7D are deleted). As a consequence, specific regions (namely, the circles indicated by solid lines in FIG. 7D) are obtained from the optical flow in this manner.

Next, a description is given of how to predict three-dimensional motion involving a depth direction from the position of the acquired specific region and the two-dimensional motion of the region, with reference to FIG. 10 and FIGS. 11A to 11D.

Figure 10:
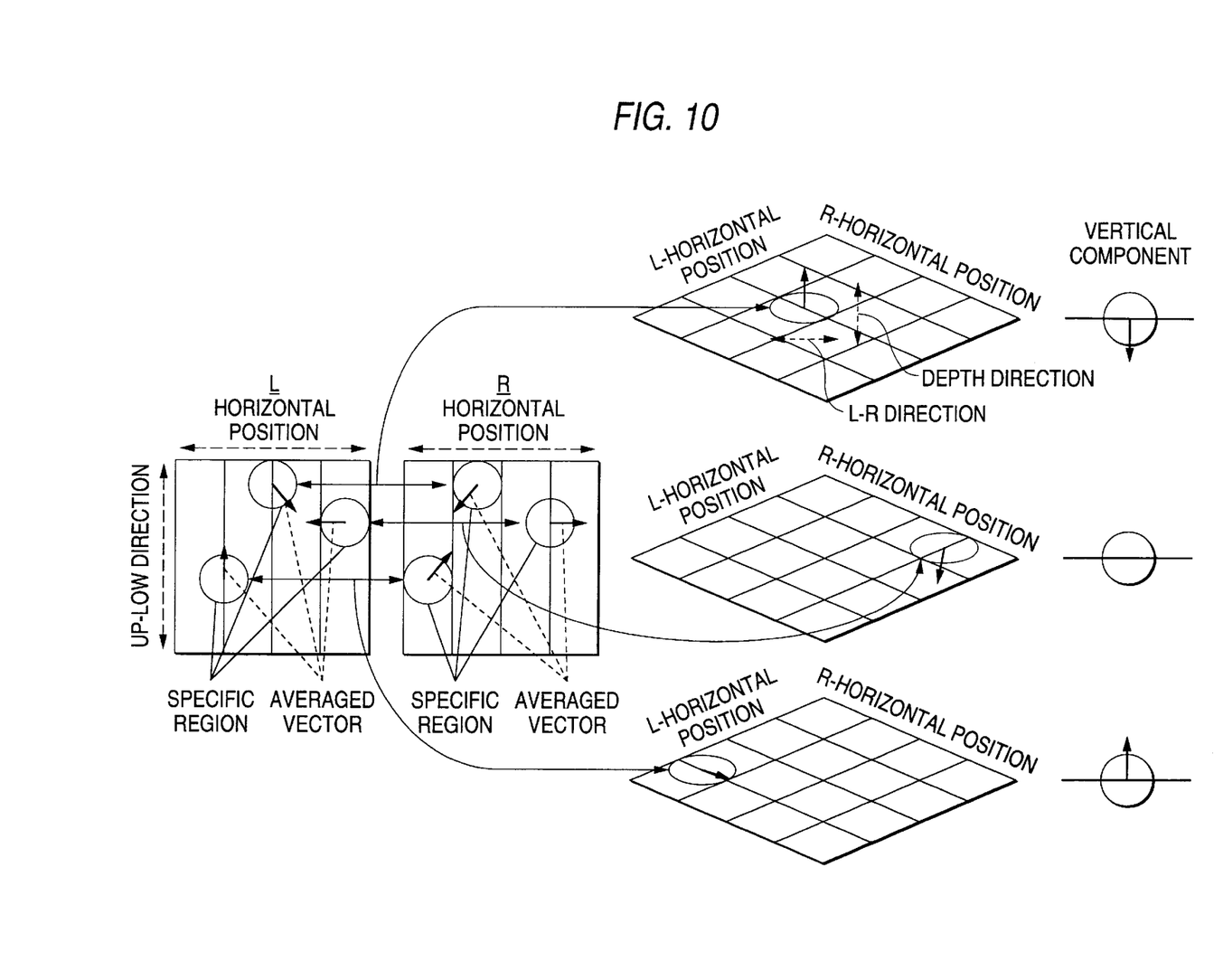
FIG. 10 is an explanatory diagram explaining operation of a three-dimensional motion detecting unit according to embodiment 1 of the present invention.
Figure 11A:
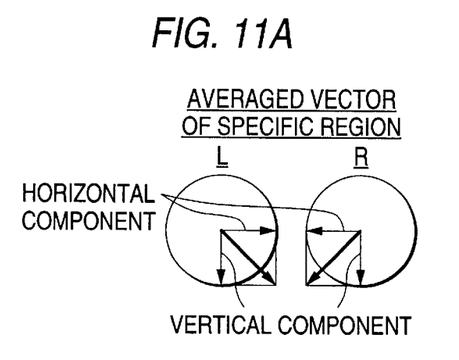
FIGS. 11A to 11D are explanatory diagrams explaining operation of a three-dimensional motion detecting unit according to embodiment 1 of the present invention.
Figure 11B:
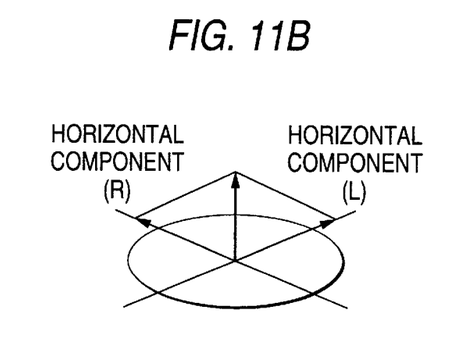
Figure 11C:
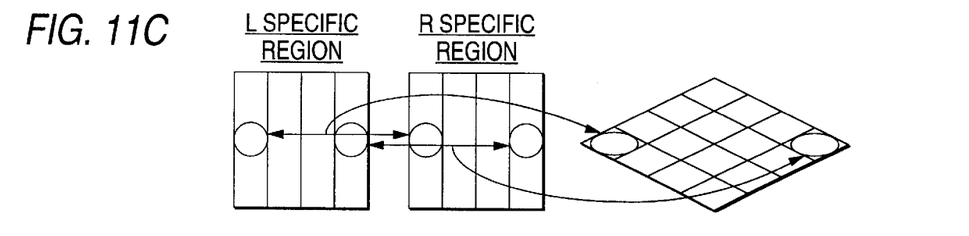

As indicated in FIG. 10, the three-dimensional motion detecting unit 4 first selects one specific region on an L side and another specific region on an R side as an identification pair, in which a difference between an upper position and a lower position is smaller than or equal to a threshold value, as specific regions acquired at different imaging angles (referred to as an "L side" and a "R side" hereinafter). With respect to this identification pair, positions along right and left directions and a depth direction are predicted from horizontal positions on the L side and the R side. Next, as shown in FIG. 11A, averaged vectors of the specific regions on the L side and the R side, functioning as the identification pair, are subdivided into a horizontal direction component and a vertical direction component. Then, as shown in FIG. 11B, the horizontal direction components of both the specific regions are vector-synthesized with each other to produce a motion vector involving the right and left directions and the depth direction. It should also be understood that the vertical direction component directly constitutes a motion vector in the vertical direction within a three-dimensional space.

Figure 11D:
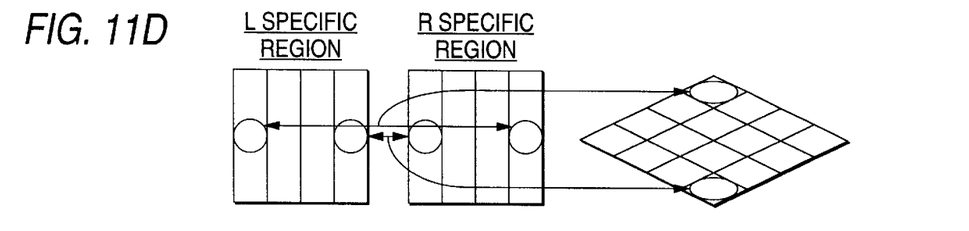

When the above-described identification pair is selected, for example, results shown in FIG. 10C and FIG. 10D are obtained. In other words, there are cases in which the identification pair cannot be exclusively selected. In this case, for instance, such specific regions located close to the horizontal positions of the specific regions on the L side and the R side are selected as the identification pair (case of FIG. 11C) and are previously set as an initial condition.

Figure 12A:
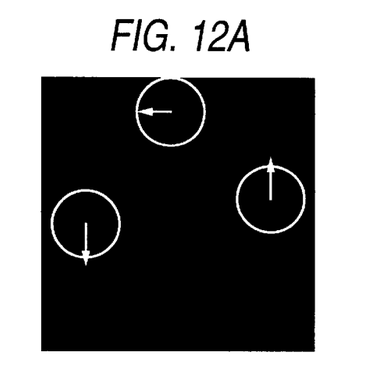
FIGS. 12A and 12B are illustrations showing three specific regions and an averaged vector of each of these specific regions which are acquired from the images obtained from the respective image sensors according to embodiment 1 of the present invention.
Figure 12B:
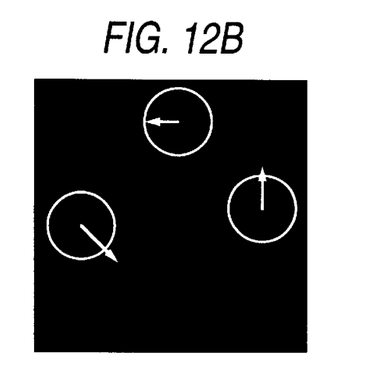
Figure 13A:
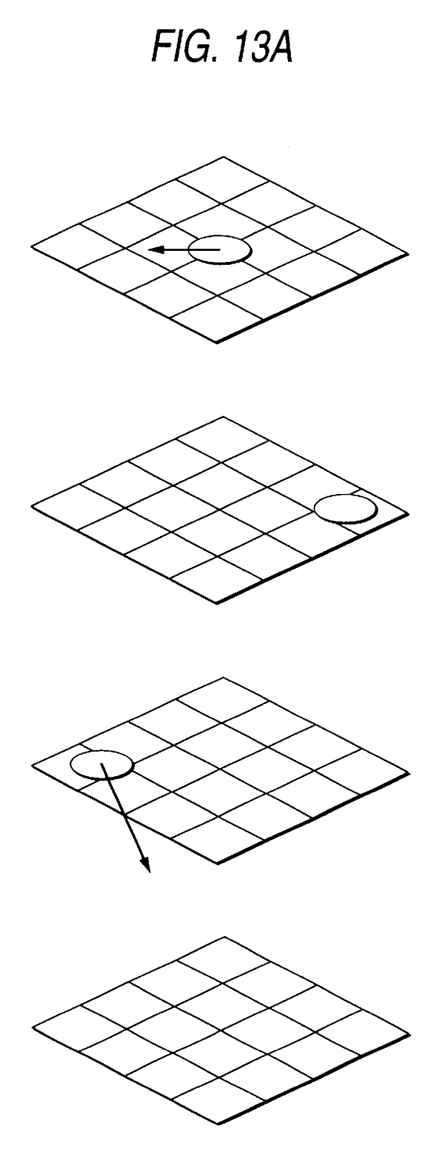
FIGS. 13A and 13B are illustrations representing a horizontal component and a vertical component of a motion vector within a three-dimensional space predicted at vertical positions where an identification pair is present in accordance with embodiment 1 of the present invention.
Figure 13B:
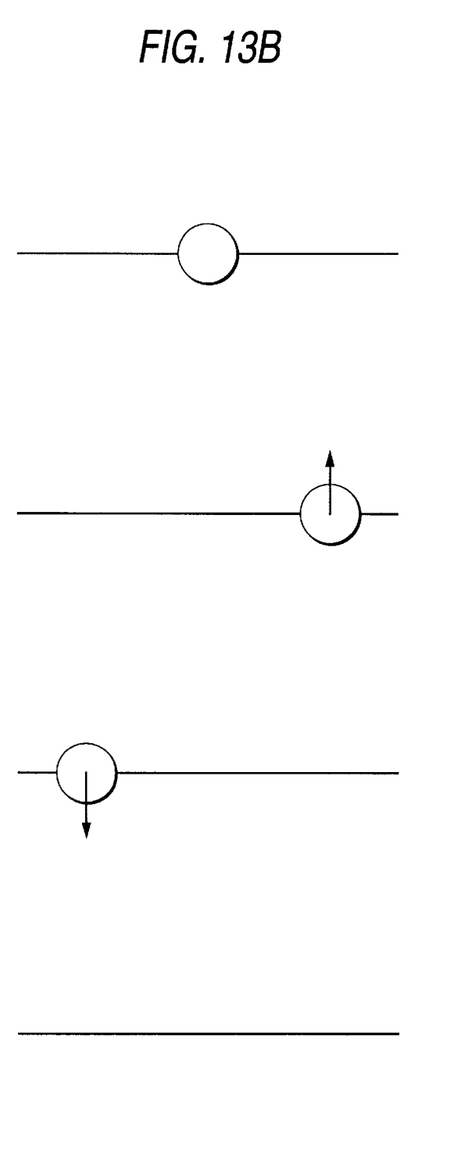

White circles and white arrows shown in FIGS. 12A and 12B correspond to the specific regions denoted by the white circles, and the averaged vectors of the motion vectors indicated by the white arrows shown in FIGS. 6A and 6B, respectively. Based on the positions of the specific regions from respective different imaging angles and the two-dimensional motions of these specific regions, the three-dimensional motion detecting unit 4 outputs results such as illustrated in FIGS. 13A and 13B. In other words, FIG. 13A represents predicted positions (circular symbols) along either the depth direction or the right and left directions, and motion (arrow symbols) along the horizontal direction at the upper and lower positions where the identification pairs of the L-sided specific region and the R-sided specific region are located. FIG. 13B shows motion (arrow symbols) of each of the identification pair along the vertical direction.

The portion predicting unit 5 predicts that the three-dimensional motion acquired by the three-dimensional motion detecting unit 4 with respect to each of the specific regions corresponds to motion of a human. For instance, assuming the below-mentioned restriction condition, the portion predicting unit 5 can predict whether the motion of the specific region is equal to the motion of a specific portion of the human. As this restriction condition, for instance, as to the four levels shown in FIGS. 13A and 13B, the uppermost level is allocated to a range where the head of the human moves, the second and third levels are allocated to a range where the right and left hands move, and the lowermost level is allocated to a range where the right and left feet move. As to the right and left hands and the right and left feet, both the right hand and the right foot are allocated to the right half portions of the respective levels, whereas both the left hand and the left foot are allocated to the left half portions as an initial condition. Under such an initial condition, the portion prediction is realized when the right and left hands intersect with the right and left feet by tracing changes in the positions of the specific regions detected at respective temporal levels.

The action reproducing unit 6 moves a human model based on the motion of respective body portions, such as the head, the right and left hand, and the right and left feet, predicted by the portion predicting unit 5. As a concrete example for simulating such human motion or movement, there is an example of the human model described in "Proceedings of SIGGRAPH '95", titled "Fourier Principles for Emotion-based Human Figure Animation" (pages 91 to 96). In this example, the motion of the respective body portions of the human is expressed based on the motion along the three (x, y, z) directions related to nineteen joints of the hands, feet, and body of the human. In contrast, in accordance with this embodiment, the motion of the respective body portions predicted by the portion predicting unit 5 is applied as the input information to the action reproducing unit 6. For example, motion of a tip of a hand may be converted into rotation angles (namely, rotation angles around the x-axis, the y-axis, and the z-axis) of an elbow and of a shoulder. Also, as to motion of other body portions, the motion may be converted into rotation angles of respective joints required to produce changes in positions in conjunction with the motion of these portions. Thus, motion of the respective joints of the human model along the three directions may be acquired based on these rotation angles. As a result, the human model expressed by computer graphics may be moved in accordance with the gestures of the human.

The above-explained action recognizing calculation for the imaged object can be realized by an action recognizing program, and this action recognizing program is recorded on a recording medium.

As described above, in accordance with this embodiment 1, since the direction and the magnitude of the motion of the acquired image with respect to each of the pixels are directly calculated from an optical flow without employing any auxiliary means, such as light reflection markers, the two-dimensional motion of this image can be correctly acquired. As a consequence, the acquired two-dimensional motion need not be corrected off line, but the motion of a human and the like can be reproduced in real time.

It should be understood that when the motion of the imaged object is reproduced, if such a dynamic model as described in the below-mentioned publication is employed, then the motion of a body portion which could not be predicted by the portion predicting unit 5 can also be acquired. That is, this dynamic model is described in "Using Dynamic Analysis for Realistic Animation of Articulated Bodies", IEEE Computer Graphics and Applications, volume 7, No. 6, pages 12 to 27, 1987. As a result, the motion reproducibility can be further improved. In this publication, possibilities of the motion of the elbow are expressed by a dynamic equation from the motion of the wrist and of the shoulder. Then, since this dynamic equation is calculated, the motion of the portion which could not be predicted by the portion predicting unit 5 may also be acquired.

In this embodiment, the motion of the imaged object has been reproduced on the model in real time. Alternatively, after the motion of the model is corrected off line with respect to the motion information of the imaged object acquired in a manner similar to the above-described embodiment to express this motion in a more realistic manner, the corrected motion may be transmitted to the model.

Figure 14:
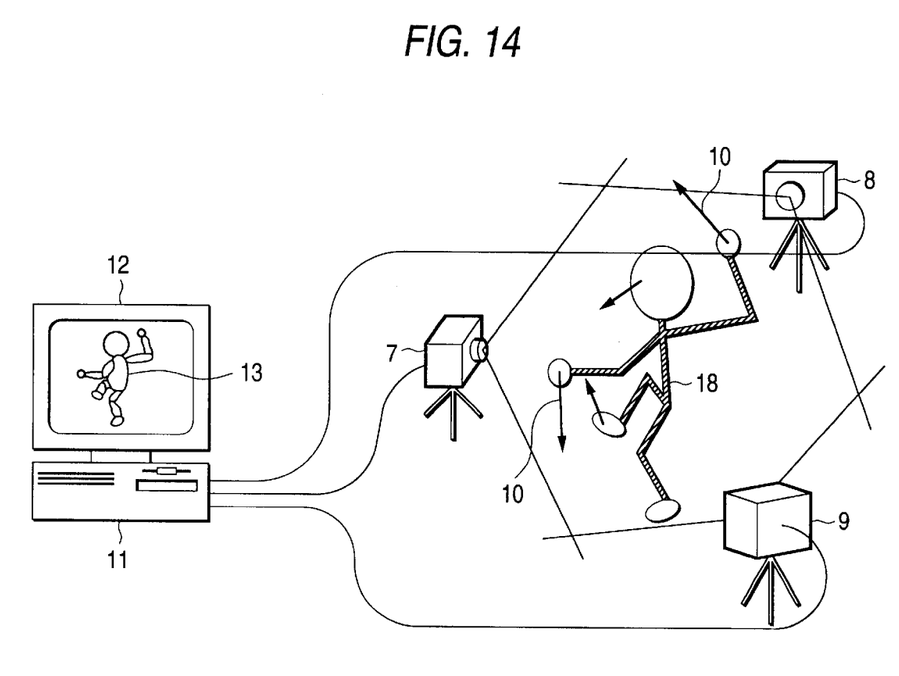
FIG. 14 is a diagram indicating an arrangement of an image input unit according to embodiment 1 of the present invention including three image sensors.

Also, in this embodiment, the image input unit 1 includes two image sensors 7 and 8. Alternatively, the image input unit may include three image sensors 7 to 9, as indicated in FIG. 14. Four or more image sensors may be employed.

In addition, the motion of the imaged object may be reproduced by, for instance, motion of an automatic control machine, such as a robot, other than the computer graphic representation. In other words, information related to the motion of the respective body portions of a human, which has been acquired in this embodiment, may be transmitted by radio signals to a robot. In response to the motion information radio signals, rotations of respective joints of the robot, such as the elbow, the knee, the neck, and the shoulder, may be controlled. As a signal receiving system provided on the robot when the motion information is transmitted, a single receiver apparatus mounted on the robot may receive the motion information radio signal and may transmit a control signal to the respective joints. Alternatively, receiver apparatus may be mounted on the respective joints to receive the control signals.

By employing an alternative arrangement, while controlling a human-like robot having a head, right and left arms, and right and left feet, dangerous work may be executed by the robot instead of a human who cannot enter dangerous areas involving such dangerous work.

Furthermore, the motion information for the reproduced imaged object may be transmitted to a game machine and the like, so that a game operation may be performed without employing an interface such as a joy stick.

Moreover, in this embodiment, the action reproducing unit 6 has a single model for reproducing the motion of the imaged object. Independent of this single model, another model into which detailed motion of a wrist and a joint has been previously entered may be alternatively usdt, and a mutual effect between this second model and the model described above for reproducing the motion of the imaged object may be realized in a simulation. Such an alternative example will now be represented.

In commercially available sports combative (fighting) games, motion of characters of counter parties (confronting parties) is calculated by game machines (computers), whereas there are various fight-back attitudes of counter parties attacked by game characters manipulated by game players. Also, the characters and a mutual effect between this newly set model and the above-described model reproducing the motion of the imaged object may be realized in a simulation. Such an alternative example will now be represented.

Since the characters of the game players may sometimes stumble, the game players are required to manipulate the characters properly in order to avoid stumbling of the characters. The game players may have virtual experiences of the mutual effects between the counter parties and the characters of the game players by observing the mutual effects between the characters in such sport combative games. If the action recognizing apparatus according to this embodiment is employed in such a sport combative game, then the game manipulation may be replaced by the action of the game player himself. As a result, realistic feelings of the mutual effects between the game character and the game player may be increased. In other words, the game player himself may train his instantaneous power to attacking and defending actions, so that the game player may train the character in a simulation.

As previously described, the action recognizing apparatus of the first arrangement of the present invention includes an image input unit for forming an image including motion of an imaged object at a plurality of imaging angles with a plurality of image sensors to acquire a plurality of two-dimensional images; a two-dimensional motion detecting unit for calculating direction and magnitude of motion of each pixel within each of the two-dimensional images of the image input unit; a region specifying unit for specifying a region having a movement larger than or equal to a threshold movement, the motion magnitude being calculated by the two-dimensional motion detecting unit; a three-dimensional motion detecting unit for detecting the position of the region specified by the region specifying unit with respect to the plurality of two-dimensional images, whereby a three-dimensional position of the specific region and three-dimensional motion of the specific region are calculated; a portion predicting unit for predicting whether the three-dimensional motion of the specific region calculated by the three-dimensional motion detecting unit corresponds to any of the portions of the imaged object; and an action reproducing unit for moving a model in a simulation based the motion predicted by the portion predicting unit with respect to each of the portions, whereby motion of the imaged object is reproduced. Accordingly, the motion of the imaged object under various conditions can be reproduced on the model without requiring an auxiliary means such as light reflection markers. Also, since the direction and the magnitude of the motion of the acquired image with respect to each of the pixels are directly calculated, the two-dimensional motion of this image can be correctly acquired. As a consequence, the acquired two-dimensional motion need not be corrected off line, but the motion of a human can be reproduced in real time.

Also, in the action recognizing apparatus according to the second arrangement of the present invention, the region specifying unit subdivides a two-dimensional image into a plurality of scanning ranges which overlap with each other; scans each of the scanning ranges to select as a subject region a region having a maximum averaged motion magnitude of the respective pixels; and selects a region in which the averaged motion magnitude is larger than or equal to a predetermined value as the specific region. As a result, a region having a large motion can be correctly calculated, and thus the motion of the imaged object can be correctly reproduced.

Also, in the action recognizing apparatus according to the third arrangement of the present invention, the action reproducing unit reproduces the motion of the imaged object by motion of a model expressed by computer graphics. As a consequence, the motion of a human under various conditions can be reproduced by computer graphics in real time without requiring auxiliary means such as light reflection markers.

Also, in the action recognizing apparatus according to the fourth arrangement of the present invention, the action reproducing unit reproduces the motion of the imaged object in the motion of an automatic control machine. Therefore, dangerous work within an area where no human is allowed to enter can be executed by a robot instead of a human.

Also, in the action recognizing apparatus according to the fifth arrangement of the present invention, the action reproducing unit includes another model, different from the model used to reproduce the motion of the imaged object, whereby a mutual effect between the motion of the imaging operation and the motion of the another model is realized in a simulation. As a consequence, realistic feelings of mutual effects can be increased, and thus sports such as JUDO and wrestling may be practiced in a simulation.

Also, in a recording medium, an action recognizing program causes a computer to calculate a direction and magnitude of motion of each of pixels within two-dimensional images imaged at a plurality of imaging angles; specify a region having a calculated motion magnitude larger than or equal to a predetermined magnitude; position the region with respect to the plurality of two-dimensional images, whereby a three-dimensional position of the region and three-dimensional motion of the region are calculated; predict the three-dimensional motion of the calculated region to correspond to any of the portions of the imaged object; and move a model in a simulation based on the motion with respect to each of the predicted portions, whereby motion of the imaged object is reproduced on the model. The motion of the imaged object can be reproduced on the model in real time.

What is claimed is:

1. An action recognizing apparatus comprising:
    an image input unit for forming images of an imaged object at a plurality of imaging angles with a plurality of image sensors, and acquiring a plurality of two-dimensional images indicating motion of the imaged object, each of the two-dimensional images including a plurality of pixels;
    a two-dimensional motion detecting unit for calculating direction and magnitude of motion of the imaged object from the pixels of the two-dimensional images;
    a region specifying unit for specifying at least one specific region within the two-dimensional images where the motion of the imaged object has a magnitude at least equal to a threshold motion magnitude, wherein said region specifying unit
        subdivides the two-dimensional images into a plurality of scanning ranges which may overlap each other,
        scans each of the scanning ranges to select as the specific regions the scanning ranges having maximum averaged motion magnitude, and
        selects the scanning ranges having an averaged motion magnitude larger than the threshold motion magnitude as the specific regions;
    a three-dimensional motion detecting unit for establishing position of a specific region specified by said region specifying unit relative to the two-dimensional images, and calculating a three-dimensional position of the specific region and a three-dimensional motion of the specific region;
    a portion predicting unit for predicting whether the three-dimensional motion of the specific region calculated by said three-dimensional motion detecting unit corresponds to any of a plurality of respective portions of the imaged object; and
    an action reproducing unit for moving a model in a simulation based on the three-dimensional motion predicted by said portion predicting unit with respect to each of the plurality of portions so that the motion of the imaged object is reproduced by the model.

2. The action recognizing apparatus as claimed in claim 1 wherein said action reproducing unit reproduces the motion of the imaged object as motion by a computer graphic model.

3. The action recognizing apparatus as claimed in claim 1 wherein the imaged object is a human and the portions correspond to body parts of the human including head, hands, and feet.

4. A recording medium in which an action recognizing program is recorded, the action recognizing program causing a computer to:
    calculate a direction and magnitude of motion of an imaged object from two-dimensional images of the imaged object formed at a plurality of imaging angles, each of the two-dimensional images including a plurality of pixels;
    specify a specific region of the plurality of two-dimensional images having a calculated motion magnitude at least equal to a threshold motion magnitude by
        subdividing the two-dimensional images into a plurality of scanning ranges which may overlap each other,
        scanning each of the scanning ranges to select as the specific regions the scanning ranges having maximum averaged motion magnitude, and selecting the scanning ranges having an averaged motion magnitude larger than the threshold motion magnitude as the specific regions;

position the specific region with respect to the plurality of two-dimensional images and calculate a three-dimensional position of the specific region and three-dimensional motion in the specific region;

predict the three-dimensional motion of the specific region corresponding to any of a plurality of portions of the imaged object; and move a model in a simulation based on motion with respect to each of the portions of the imaged object to reproduce motion of the imaged object by the model.

* * * * *